F. J. A. RHODE.
WEED AND TRASH ROD FOR PLOWS.
APPLICATION FILED AUG. 19, 1915.
1,162,310. Patented Nov. 30, 1915.
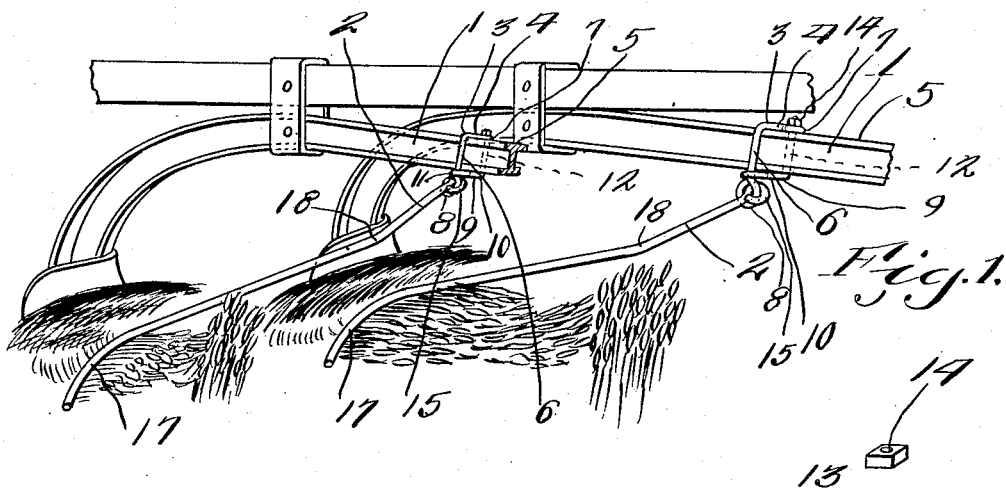
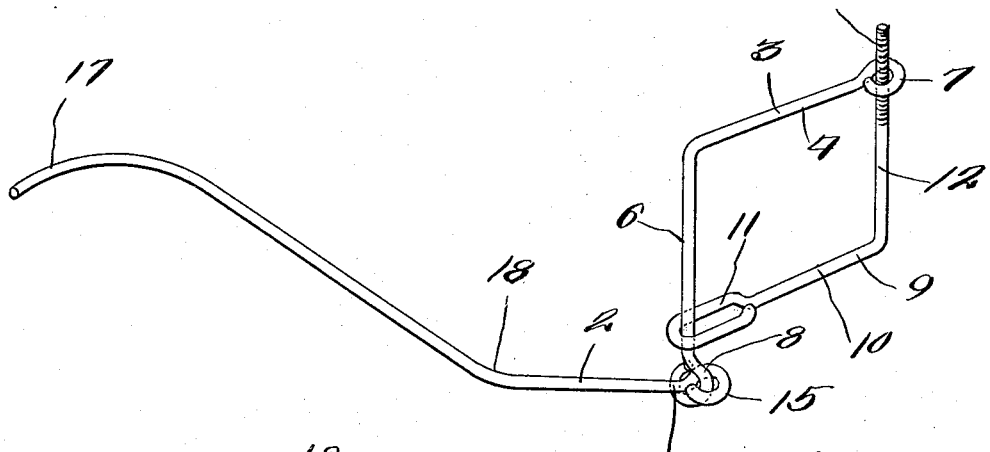
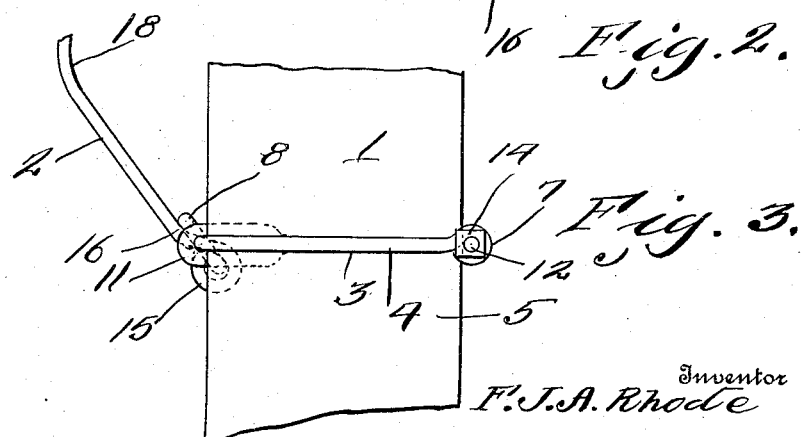
Witnesses
Frances G. Dowell
Philip Turell
Inventor
F. J. A. Rhode
By D. Swift & Co.
WS Attorneys

UNITED STATES PATENT OFFICE.

FREDERICK J. A. RHODE, OF HAMPTON, NEBRASKA.

WEED AND TRASH ROD FOR PLOWS.

1,162,310.   Specification of Letters Patent.   Patented Nov. 30, 1915.

Application filed August 19, 1915. Serial No. 46,288.

*To all whom it may concern:*

Be it known that I, FREDERICK J. A. RHODE, a citizen of the United States, residing at Hampton, in the county of Hamilton and State of Nebraska, have invented a new and useful Weed and Trash Rod for Plows; and I do hereby declare the following to be a full, clear, and exact description of the invention, such as will enable others skilled in the art to which it appertains to make and use the same.

This invention relates to an improved weed and trash rod for gang and other plows, particularly designed for turning the weeds and trash under the ground or dirt, as it is thrown up by the plow or mold board, and an object of the invention is to provide a weed or trash turning rod of a particular shape, to accomplish the foregoing purpose.

Another object of the invention is to provide improved means for attaching the rod to the plow beam in such wise as to prevent the rod from dragging by the trash or weeds, but when there is a great quantity of weeds or trash, to permit the rod to lift or ride over the trash, and after passing over a great or excessive quantity of trash and weeds, it will drop back into place.

A further object of the invention is to avoid holding the weed or trash turning rods perfectly rigid, which would cause clogging.

In practical fields the details of construction may necessitate alterations, falling within the scope of what is claimed.

In the drawings:—Figure 1 is a view in perspective illustrating more than one of the weed or trash turning rods. Fig. 2 is an enlarged detail view of one of the rods, and its means for attaching the same to a plow beam. Fig. 3 is a plan view of the means for attaching the rods to the beam, showing the beam applied.

Referring to the drawings, 1 designates the plow beams, to each one of which weed or trash turning rods 2 are connected, as shown in Fig. 1. To connect each of said rods an angular rod 3 is provided, the part 4 of which engages the top 5 of the beams, whereas the part 6 engages the side of the beam. The part 4 terminates in an eye 7, while the part 6 at its lower end terminates in an eye 8. To hold the angular rod 3 to the plow beam, a second angular rod 9 is provided. The part 10 of the angular rod 9 terminates at one end in an elongated loop 11, through which the part 6 of the angular rod 3 extends, the part 10 extending substantially transversely under the plow beam below and opposite the part 4. The part 12 of the angular rod 9 extends upwardly and adjacent the opposite side of the plow beam substantially opposite the part 6 of the angular rod 3, and through the eye 7, and terminating in a threaded end 13 for the reception of the nut 14, thereby connecting the two angular rods rigidly and firmly to the beam.

It is to be noted that the part 6 of the angular rod 3 may be of considerable length, so as to fit the plow beams of the greatest thickness, thereby permitting the same angular rod 3 that may be used on the thickest beam, to be employed in connection with the narrowest beam, in which case the nut 14 may be adjusted, so as to bring the part 10 of the angular rod 9 close against the under surface of the plow beam.

It will be observed that the eye 8 at the lower end of the part 6 extends at an angle to the loop 11, so as to prevent the loop 11 from detaching from the part 6, when the angular rods are loosened sufficiently to permit of longitudinal adjustment of them on the beam. In other words, by constructing the eye 8 on an angle as shown in Fig. 3, the eye is prevented from passing through the loop 11. However, when attaching the angular rod 9, the loop 11 is arranged parallel with the angular disposition of the eye 8, but below the eye, then the angular rod 9 is moved upwardly, until the eye passes through the loop, and then the rod 9 is placed in the position shown in Fig. 2 with its threaded end extending through the eye 7.

Each of the weed or trash turning rods consist of a single length of heavy rod iron, having an eye 15 at one end connected to the eye 8, so that the rod at 16 will contact with one side of the eye 8, as shown in the drawings, so as to prevent the rod from swinging completely under the plow beam, and not perform the function that is intended. The other end of the rod 2 terminates in a gradual elongated curved end portion 17, which, owing to the rod being bent at a slight obtuse angle as at 18 somewhat near the eyes 8 and 15, will travel over the weeds and trash slightly in advance and offset, or to one side of the plow or mold board, thereby turning the weeds down, so as to be under the earth or dirt, as it is turned by the plow or mold board. In constructing this rod 2 particular care must be exercised in forming the bend 18, so that the curved portion 17 will be sure to travel in the proper position, in order to turn the trash and weeds down under the earth or dirt as it is thrown up by the plow or mold board thereof.

By the improved attaching means of the turning rod, the rod may be attached to all makes and constructions of plow beams. The eyes 8 and 15 are not only so connected as to prevent the rod 18 from swerving under the plow beam, but also permitting the weed and trash turning rod to raise and lower, in order to pass over a great bulk of weeds and trash.

The invention having been set forth, what is claimed as new and useful is:—

1. In combination, a pair of angular rods, one having an adjustable loop connection with the other, and means on one rod for adjusting the two angular rods relative to each other for attaching the different sized plow beams, the lower end of one of the angular rods having an eye extending at an angle to the loop of the loop connection, a weed and trash turning rod having an eye at one end linked to the eye at the lower end of one of the angular rods, and having a gradual elongated curve at the other end acting to drag over the weeds and trash to turn them down under the earth as it is thrown up by the plow, said weed turning rod having an obtuse bend somewhat near the angular eye so that the gradual curved end portion will drag slightly in advance and to one side of the plow or mold board thereof.

2. In combination, a pair of angular rods, one having an adjustable loop connection with the other, and means on one rod for adjusting the two angular rods relative to each other for attaching the different sized plow beams, the lower end of one of the angular rods having an eye extending at an angle to the loop of the loop connection, a weed and trash turning rod having an eye at one end linked to the eye at the lower end of one of the angular rods, and having a gradual elongated curve at the other end acting to drag over the weeds and trash to turn them down under the earth as it is thrown up by the plow, said weed turning rod having an obtuse bend somewhat near the angular eye so that the gradual curved end portion will drag slightly in advance and to one side of the plow or mold board thereof, said angular eye of one of the angular rods acting to prevent the weed turning rod from swerving under the plow beam.

3. In combination with a plow beam, a combined weed and trash turning rod having a gradual elongated curve at its rear end adapted to travel slightly in advance and to one side of the plow or mold board thereof, to turn the weeds and trash down under the earth as it is thrown up, the other end of the rod having an eye, and means attached to the eye for connecting the rod to the plow beam, said means including a second eye connected to the first eye and extending at such angle and designed to be contacted with by the rod as to prevent it from swerving under the plow beam, said rod having an obtuse bend somewhat near the connected eyes to cause the gradual elongated curved portion of the rod to travel in advance and to one side of the plow or mold board thereof.

In testimony whereof I have signed my name to this specification in the presence of two subscribing witnesses.

FREDERICK J. A. RHODE.

Witnesses:
P. C. HANSEN,
W. F. POWERS.